June 18, 1963

P. A. DIEHL 3,094,259

CUP CARRIER

Filed Dec. 16, 1960

INVENTOR.
PHILIP A. DIEHL
BY Hudson, Coughton,
Williams, David & Hoffmann
ATTORNEYS June 18, 1963

P. A. DIEHL 3,094,259

CUP CARRIER

Filed Dec. 16, 1960

INVENTOR.
PHILIP A. DIEHL
BY Hudson, Coughton,
Williams, David & Hoffmann
ATTORNEYS

United States Patent Office 3,094,259
Patented June 18, 1963

3,094,259
CUP CARRIER
Philip A. Diehl, 90 W. Main St., Norwalk, Ohio
Filed Dec. 16, 1960, Ser. No. 76,282
3 Claims. (Cl. 224—48)

The present invention relates to tray-like devices for holding and/or carrying a plurality of articles, such as paper cups, ice cream cones and the like.

The invention contemplates the provision of a novel tray-like device for holding a plurality of articles, preferably paper cups, ice cream cones, and the like, particularly while they are being served, which device will be simple in construction, inexpensive, easily distributed, convenient to use and reliable in service.

The invention resides in certain constructions and combinations and arrangements of parts and further advantages of the invention will be apparent to those skilled in the art to which it relates from the following description of the preferred embodiment described with reference to the accompanying drawings forming a part of this specification, in which similar reference characters designate corresponding parts, and in which.

Figure 1:
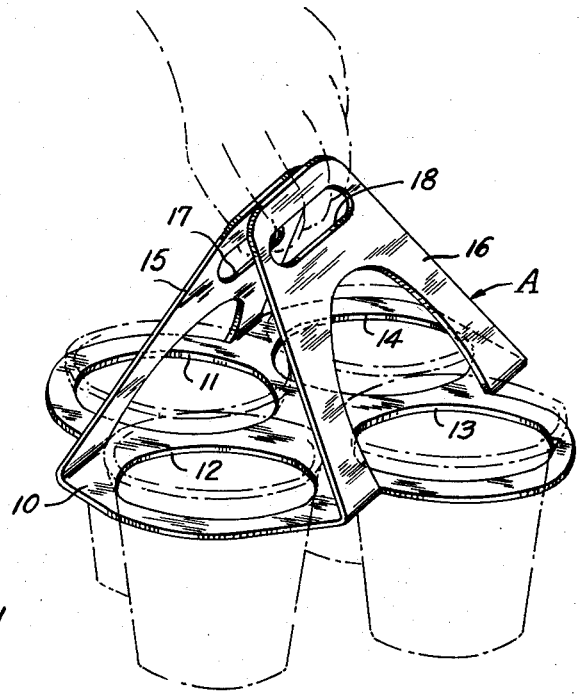
FIG. 1 is a perspective view of a device embodying the present invention being used to hold or carry a plurality of paper cups, shown merely in dot-dash lines, containing liquid, for example, coffee, soft drinks, etc.
Figure 2:
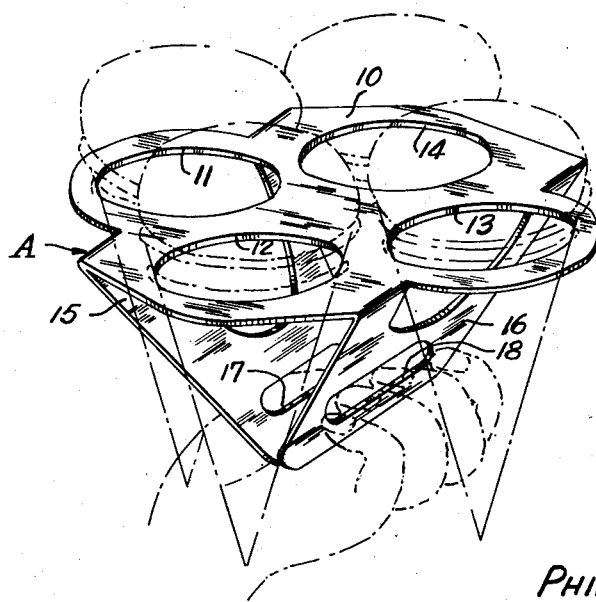
FIG. 2 is a perspective view of the device shown in FIG. 1, inverted and being used to hold or carry a plurality of ice cream cones also merely shown in dot-dash lines.
Figure 3:
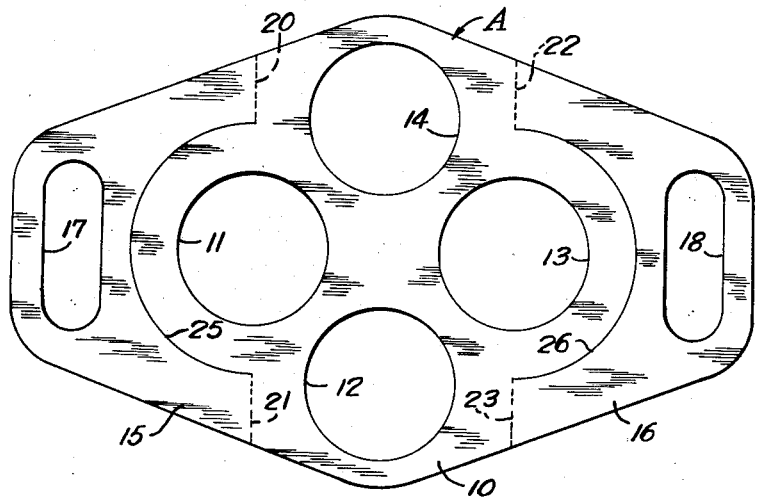
FIG. 3 is a plan view of the device shown in FIGS. 1 and 2 with the handle portions thereof in the plane of the body portion.
Figure 4:
FIG. 4 is a side elevational view of the device as shown in FIG. 3.
Figure 5:
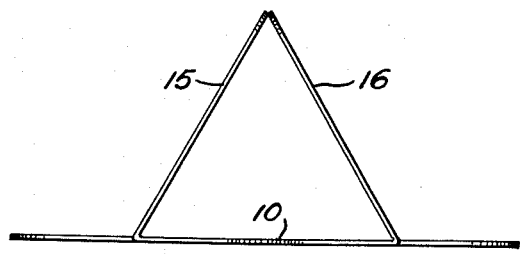
FIG. 5 is a view similar to FIG. 4 but with the handle portions moved to the positions shown in FIGS. 1 and 2.

While the invention is susceptible of various modifications and alternate constructions, the preferred embodiment is shown in the drawings and herein described in detail. It is to be understood, however, that there is no intention to thereby limit the invention to the specific forms disclosed, but it is my intention to cover all modifications and alternative constructions falling within the spirit and scope of the invention as expressed in the appended claims.

Generally speaking the present device comprises a sheet-like body part provided with four article receiving apertures equally spaced or approximately equally spaced from and angularly about its center and two bail-like handle parts connected to the body part at diametrically or approximately diametrically opposite sides of the article receiving apertures.

The preferred embodiment of the invention illustrated in the drawings comprises a single piece of cardboard A scored and cut to form a body portion 10 having four circular article receiving apertures 11, 12, 13, 14 and two bail-like handle portions 15, 16 provided with finger receiving apertures 17, 18, respectively, and connected to the body portion 10 at score lines or marks 20, 21, 22, 23. The score lines 20, 21 are spaced outwardly from and located at diametrically opposite sides of the article receiving aperture 11, are parallel with a line connecting the centers of the two article receiving apertures 12 and 14 adjacent thereto, extend to the periphery of the cardboard A, and their inner ends connected by an arcuate cut 25. The score lines or marks 22, 23 are similarly located at diametrically opposite sides of the article receiving aperture 13 and have their inner ends connected by an arcuate cut 26.

Attention is called to the fact that the connections of the handle portions 15, 16 with the body portion 10 at either side of the article receiving apertures 11, 13, respectively, spanned thereby are at diametrically or substantially diametrically opposite sides of the other two articles receiving apertures 12, 14. The construction being such that the handle connections 20, 23 with the body portion 10 are equally spaced from and angularly about the center of the body portion thereby providing a well balanced article holder. Attention is also called to the fact that the article receiving apertures 11, 13 support or hold the articles positioned therein, or at least the outer parts thereof in what might be referred to as a cantilevered manner. This helps to prevent sagging of the center of the body portion with the result that lighter or thinner material may be used to make the device than would otherwise be the case.

The finger receiving holes 17, 18 are preferably made in the form of slots and of sufficient length to receive three or more fingers thus providing for a wide grip and facilitating handling of the device. The article receiving holes and the handle connections with the body part are located as close to the center of the body part as consistent with other requirements in order to reduce the size of the holder and in turn the amount of material required to make it.

The device is preferably made of cardboard but may be made of any semi-rigid sheet material. The handle and body parts are preferably made integral or of one piece and the material of which they are made is preferably such that the device can be packed, shipped, etc., flat and the handle portions moved into posiitons normal or approximately normal to the body portion at the time of use.

When the device is used to carry paper or like cups having flat bottoms the cup can be readily assembled with the carrier by laying the carrier on a table top or other flat surface with the handle portions in or substantially in the plane of the body portion. The cups are then positioned in the article receiving apertures, the handle portions bent up and the carrier subsequently raised to engage the upper parts of the cups. When it is desired to remove the cups from the holder they can be again positioned on a flat surface and the carrier handles released whereupon they will spring or can be moved outwardly and the carrier will drop to the cup supporting surface.

From the foregoing, it will be apparent that the objects and advantages heretofore enumerated as well as others have been achieved, and that there has been provided an improved cup carrier.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

Having thus described my invention, what I claim is:

1. An article holding device comprising a sheet-like body provided with four article receiving apertures approximately equally spaced from and angularly about the center thereof, two bail-like handles connected to said sheet-like body such that there is a handle connection substantially at each of two diametrically opposite sides of each of said article receiving apertures.

2. An article holding device as claimed in claim 1 in which the body and handle parts are integral.

3. An article holding device as claimed in claim 1 in which the body and handle parts are cardboard.

References Cited in the file of this patent

UNITED STATES PATENTS

| | | |
|---|---|---|
| 2,513,762 | Tyson | July 4, 1950 |
| 2,533,997 | Cochrane | Dec. 12, 1950 |
| 2,567,054 | Clement et al. | Sept. 4, 1951 |